United States Patent
Berding et al.

(10) Patent No.: US 6,844,996 B1
(45) Date of Patent: Jan. 18, 2005

(54) DISK DRIVE COMPRISING A RATCHET ARM APPLIED TO A DISK AND DISENGAGED THROUGH WINDAGE GENERATED BY THE DISK ROTATING

(75) Inventors: Keith R. Berding, San Jose, CA (US); John R. Gustafson, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 308 days.

(21) Appl. No.: 10/062,676

(22) Filed: Jan. 31, 2002

(51) Int. Cl.[7] .......................... G11B 17/00; G11B 5/012
(52) U.S. Cl. ................................................. 360/97.01
(58) Field of Search .............................. 360/97.01, 137, 360/130.34, 128, 240, 244, 97.02, 97.03; 188/180, 187, 185, 82.1, 189; 369/292, 234

(56) References Cited

U.S. PATENT DOCUMENTS

| | | | |
|---|---|---|---|
| 5,157,566 A | 10/1992 | Hishikawa et al. | ...... 360/99.08 |
| 5,572,505 A | 11/1996 | Llewellyn | ............... 369/258.1 |
| 5,768,057 A | * 6/1998 | Fernandes et al. | ....... 360/256.1 |

FOREIGN PATENT DOCUMENTS

| | | | |
|---|---|---|---|
| JP | 2001-254772 A | * | 9/2001 |
| JP | 2001-273744 A | * | 10/2001 |

OTHER PUBLICATIONS

IBM, "Apparatus to Limit Dlsk Pack Rotation During Shipping and Handling", Dec. 1999 (IBM Research Disclosure Database) No. 428169, p. 1720.*

* cited by examiner

*Primary Examiner*—Julie Anne Watko
(74) *Attorney, Agent, or Firm*—Won Tae C. Kim, Esq.; Milad G. Shara, Esq.; Howard H. Sheerin, Esq.

(57) ABSTRACT

A disk drive is disclosed comprising an enclosure, a disk, a head actuated radially over the disk, a spindle motor for rotating the disk, and a ratchet arm having a base end connected to the enclosure of the disk drive and a wind vane extending from the base end adjacent the disk. The ratchet arm engages the disk when the disk is not rotating, and the ratchet arm disengages from the disk due to windage pushing on the wind vane, the windage generated by the disk rotating at an angular velocity greater than a threshold.

16 Claims, 5 Drawing Sheets

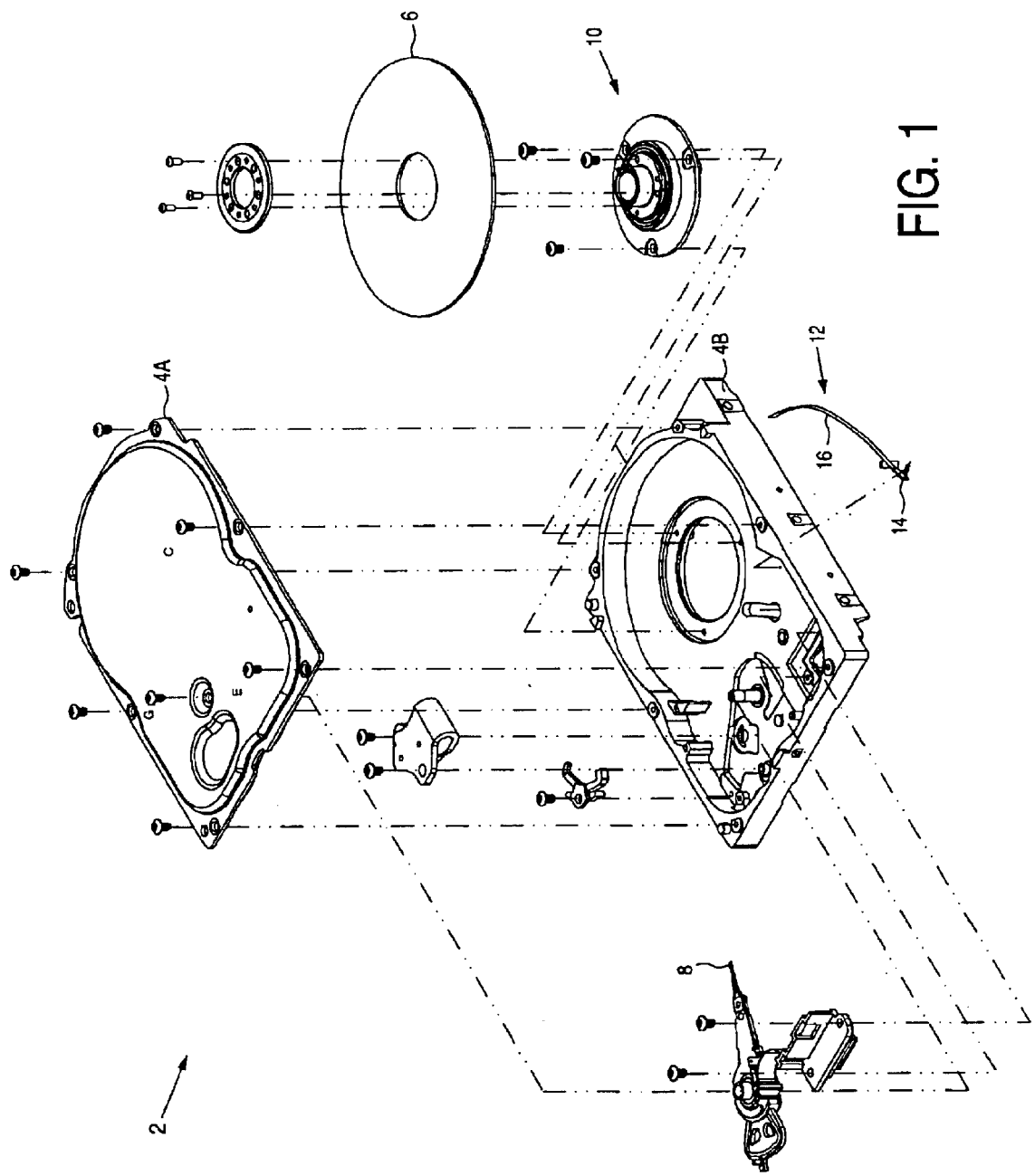

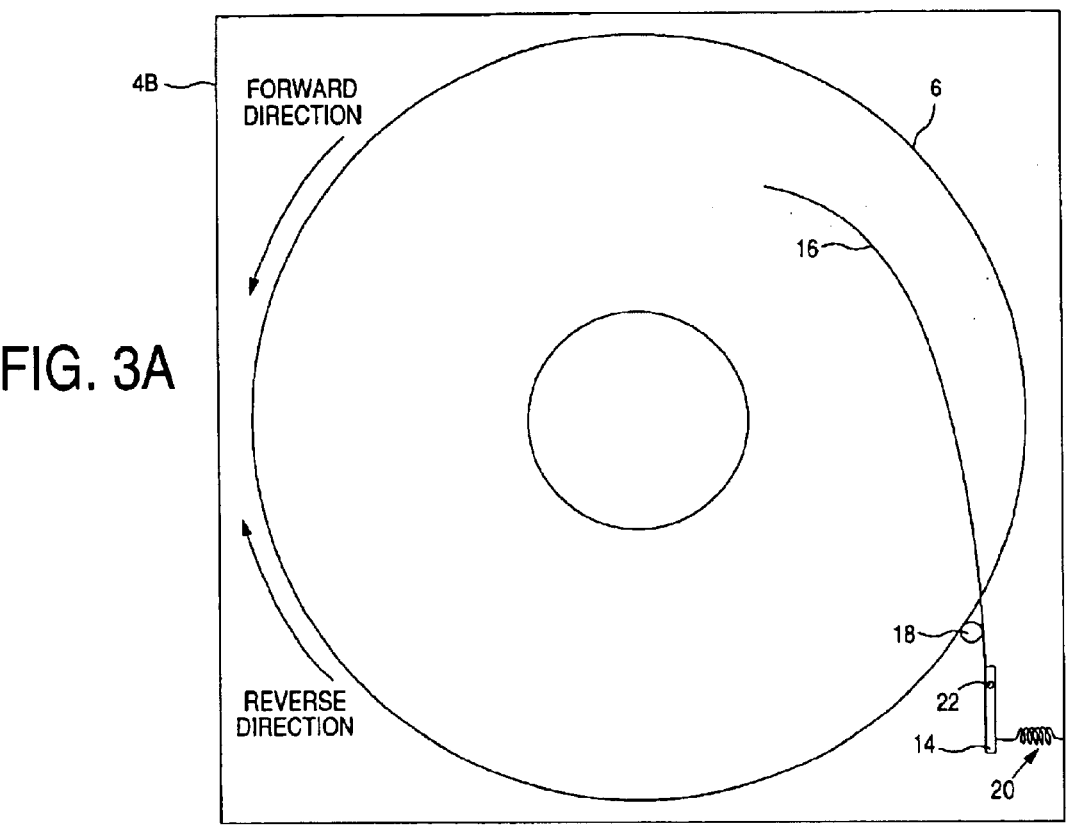
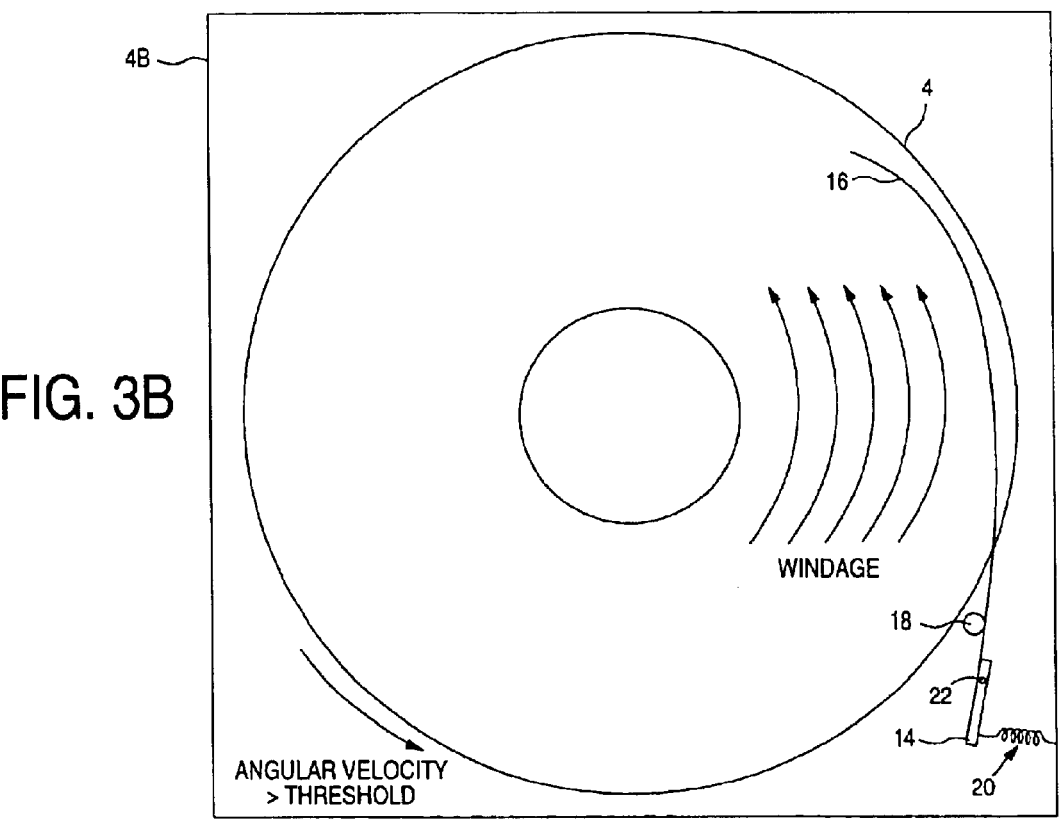

DISK DRIVE COMPRISING A RATCHET ARM APPLIED TO A DISK AND DISENGAGED THROUGH WINDAGE GENERATED BY THE DISK ROTATING

BACKGROUND OF THE INVENTION

1. Field of the Invention

The present invention relates to disk drives. More particularly, the present invention relates to a disk drive comprising a hub ratchet arm applied to a disk and disengaged through windage generated by the disk rotating.

2. Description of the Prior Art

The spindle motor within a disk drive typically employs high accuracy, low noise spindle bearings encased in lubricating and anti-rust oils. During shipping, vibrations may cause the spindle bearings to oscillate in small back and forth motions causing the bearings to push through the lubricating and anti-rust oils until there is metal-on-metal contact. The metal-on-metal contact creates micro spots of fretting corrosion which exacerbates acoustic noise and non-repeatable run-out (NRRO).

There is, therefore, a need for a disk drive which minimizes metal-on-metal contact of the spindle bearings due to vibrations during shipping.

SUMMARY OF THE INVENTION

The present invention may be regarded as a disk drive comprising an enclosure, a disk, a head actuated radially over the disk, a spindle motor for rotating the disk, and a ratchet arm having a base end connected to the enclosure of the disk drive and a wind vane extending from the base end adjacent the disk. The ratchet arm engages the disk when the disk is not rotating, and the ratchet arm disengages from the disk due to windage pushing on the wind vane, the windage generated by the disk rotating at an angular velocity greater than a threshold.

In one embodiment, the wind vane extends over a top or bottom surface of the disk. In another embodiment, the ratchet arm further comprises a stopper for engaging a side surface of the disk when the disk is not rotating and disengaged from the side surface of the disk by the wind vane when the disk is rotating at an angular velocity greater than the threshold. In one embodiment, a spring attaches the base end of the ratchet arm to the enclosure of the disk drive, the spring for biasing the stopper toward the side surface of the disk. In one embodiment, the windage rotates the ratchet arm about a pivot in a first direction, and the spring applies a biasing force to rotate the ratchet arm about the pivot in a second direction opposite the first direction. In yet another embodiment, when the ratchet arm engages the disk the ratchet arm applies a first frictional force to the disk while rotating in a first direction, and the ratchet arm applies a second frictional force to the disk while attempting to rotate in a second direction opposite the first direction, wherein the second frictional force is greater than the first frictional force. In one embodiment, the wind vane biases the ratchet arm toward a top or bottom surface of the disk and the windage pushes the wind vane in an axial direction to disengage the ratchet arm from the top or bottom surface of the disk when the disk is rotating at an angular velocity greater than the threshold. In one embodiment, the ratchet arm is radially-fixed meaning it is stationary in the radial direction with respect to the disk.

The present invention may also be regarded as a method of ratcheting rotation of a disk in a disk drive to help prevent the disk from rotating in a predetermined direction during shipping of the disk drive. A stopper is biased against a surface of the disk when the disk is not rotating, the disk is rotated to generate windage, and the windage is harnessed to disengage the stopper from the surface of the disk.

BRIEF DESCRIPTION OF THE DRAWINGS

FIG. 1 is an exploded view of a disk drive according to an embodiment of the present invention comprising a disk, a head actuated radially over the disk, a spindle motor for rotating the disk, and a ratchet arm which helps prevent the disk from rotating in a predetermined direction.

FIG. 3A shows a top view of the ratchet arm engaging the disk during shipping of the disk drive.

FIG. 3B shows a top view of the disk spinning during normal operation creating windage which disengages the ratchet from the disk allowing the disk to rotate freely.

DESCRIPTION OF THEE PREFERRED EMBODIMENTS

Figure 2A:
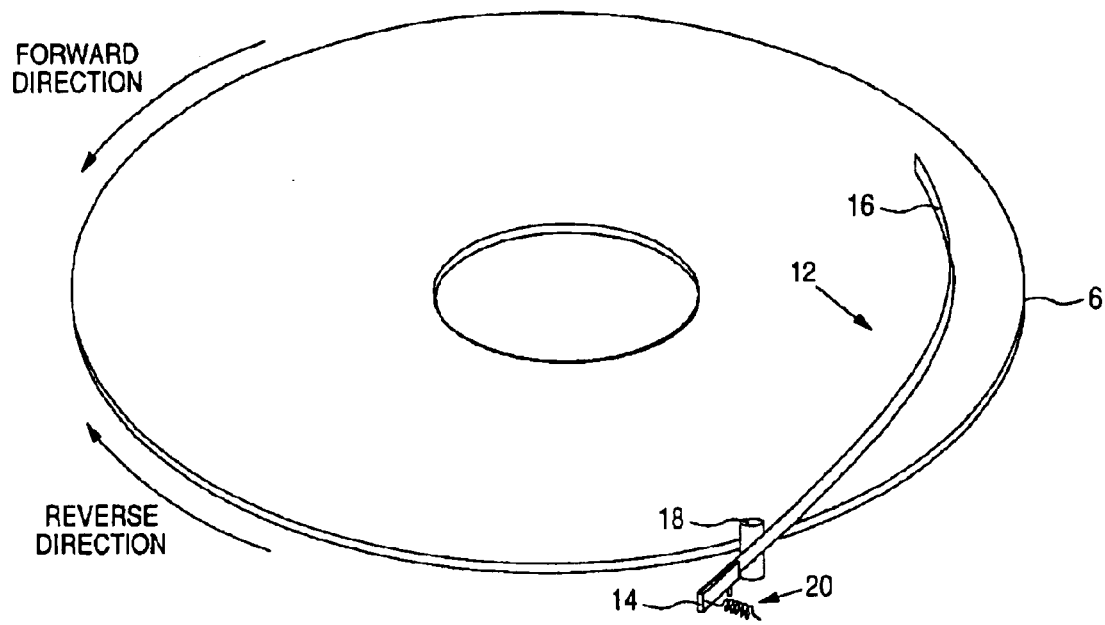
FIG. 2A shows a perspective view of the ratchet arm engaged with the disk.

FIG. 1 is an exploded view of a disk drive 2 according to an embodiment of the present invention comprising an enclosure 4A and 4B, a disk 6, a head 8 actuated radially over the disk 6, a spindle motor 10 for rotating the disk 6, and a ratchet arm 12 for engaging a surface of the disk 6. The ratchet arm 12 comprises a base 14 end connected to the enclosure 4B of the disk drive and a wind vane 16 extending from the base end 14 adjacent the disk 6. The ratchet arm 12 disengages from the disk 6 due to windage pushing on the wind vane 16, the windage generated by the disk 6 rotating at an angular velocity greater than a threshold.

In the embodiment of FIG. 1, the wind vane 16 extends over a top surface of the disk 6. The wind vane 16 may also extend over a bottom surface of the disk, and in an alternative embodiment, rather than extend over the top or bottom surface of the disk 6 the wind vane 16 may be located near the outer periphery of the disk 6. In either embodiment, the windage generated by the disk 6 rotating disengages the ratchet arm 12 from the disk 6.

FIG. 2A is a perspective view of the ratchet arm 12 engaging the disk 6. In one embodiment, the ratchet arm 12 applies a first frictional force to the disk 6 while rotating in a first direction (e.g., a forward or counter-clockwise direction), and the ratchet arm 12 applies a second frictional force to the disk 6 while rotating in a second direction (e.g., a reverse or clockwise direction) opposite the first direction, wherein the second frictional force is greater than the first frictional force. The frictional force impedes the spindle motor's rotation which helps prevent the spindle bearings from pushing through the lubricating and anti-rust oils, thereby helping to prevent the metal-on-metal contact that causes fretting corrosion.

Figure 2B:
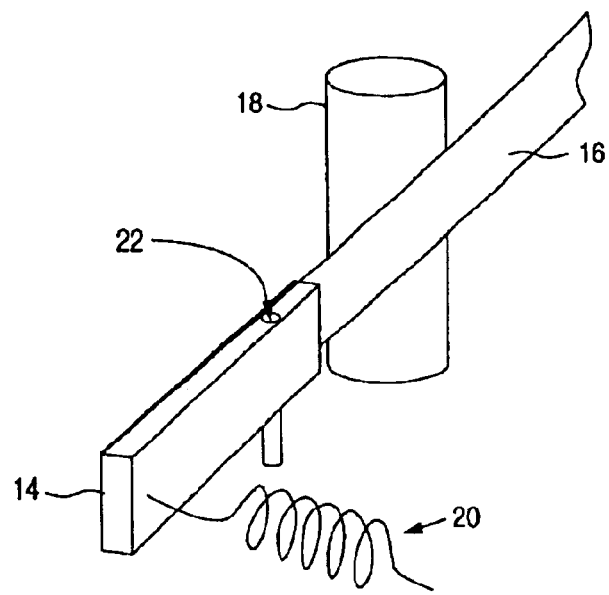
FIG. 2B shows a magnified view of the ratchet arm including a spring for attaching a base end of the ratchet arm to the enclosure of the disk drive.

As shown in FIGS. 2A and 2B, in one embodiment the ratchet arm 12 comprises a stopper 18 for engaging a side surface of the disk 6 when the disk 6 is not rotating and disengaged from the side surface of the disk 6 by the wind vane 16 when the disk 6 is rotating at an angular velocity greater than the threshold. In this embodiment, the ratchet arm 12 comprises a spring 20 for attaching the base end 14 of the ratchet arm 12 to the enclosure 4B of the disk drive 2, the spring 20 for biasing the stopper 18 toward the side surface of the disk 6. The windage generated by the disk 6 spinning rotates the ratchet arm 12 about a pivot 22 in a first direction, and the spring 20 applies a biasing force to rotate the ratchet arm 12 about the pivot 22 in a second direction opposite the first direction.

As shown in FIG. 3A, when the disk 6 rotates in the reverse direction (clockwise) the friction coefficient and angle between the stopper 18 and the disk causes the stopper 18 to "bite" into the edge of the disk 6 and prevent it from rotating. When the disk 6 rotates in the forward direction (counter clockwise) during a normal spin-up operation, the frictional force of the stopper 18 creates a drag on the disk 6. As shown in FIG. 3B, when the disk 6 reaches a sufficient angular velocity the resulting windage pushes on the wind vane 16 causing the ratchet arm 12 to rotate about the pivot 22 thereby disengaging the stopper 18 from the side surface of the disk 6 so that the disk 6 rotates freely without significant drag or wear.

The ratchet arm 12 may comprise any suitable material such as metal or plastic. The base end 14 and wind vane 16 may be separately attached components or they may be integrally formed as a single component. The curvature of the wind vane 16 may be formed using any suitable processes, such as bending metal or injection molding plastic. The stopper 18 may also comprise any suitable material, such as rubber or plastic, and in one embodiment the surface of the stopper 18 is coated or textured to increase the friction coefficient. The stopper 18 may be a separate component attached to the wind vane 16 (e.g., through welding or glue), or the stopper 18 may be integrally formed with the wind vane 16 into a single component, for example, through injection molding.

Figure 4A:
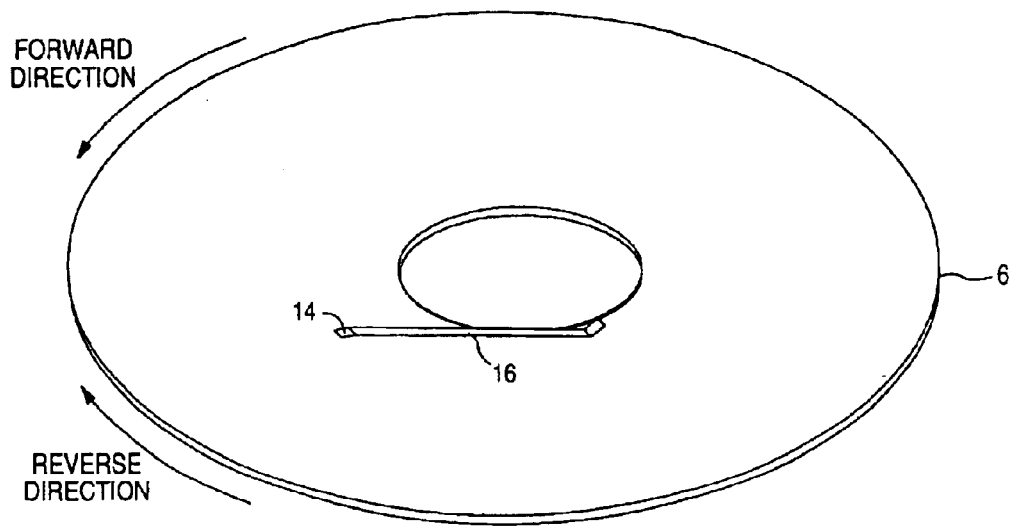
FIG. 4A shows an embodiment of the present invention wherein the ratchet arm comprises a wind vane which is biased toward a top surface of the disk.
Figure 4B:
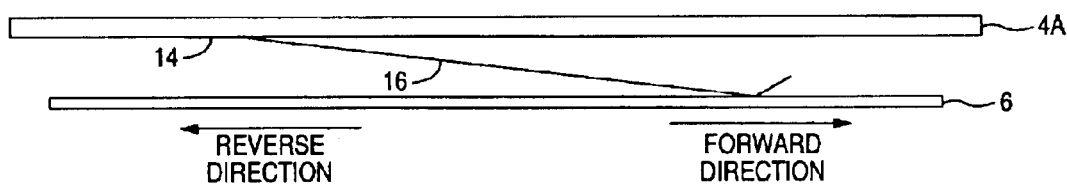
FIG. 4B shows a side view of the disk and ratchet arm shown in FIG. 4A, wherein the wind vane engages the disk when the disk is not rotating.
Figure 4C:
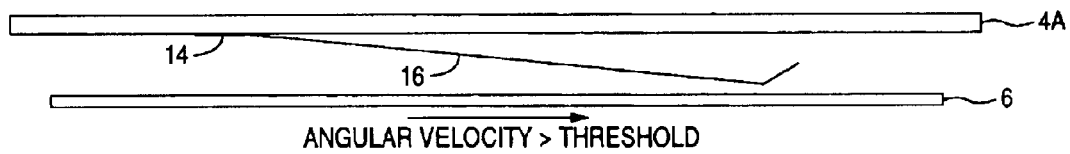
FIG. 4C illustrates how the windage generated by the disk rotating pushes the wind vane in an axial direction away from the top surface of the disk.

FIG. 4A shows an embodiment of the present invention wherein the ratchet arm biases a wind vane 16 toward a top surface of the disk 6. In alternative embodiment, the ratchet arm biases the wind vane 16 toward the bottom surface of the disk 6. In the embodiment of FIG. 4A, the base end 14 of the ratchet arm is attached to a top surface of the enclosure (bottom surface of cover 4A). FIG. 4B shows a side view of the disk 6 and ratchet arm shown in FIG. 4A, wherein the wind vane 16 engages the disk 6 when the disk is not rotating. FIG. 4C illustrates how the windage generated by the disk 6 rotating pushes the wind vane 16 in an axial direction away from the top surface of the disk 6. In one embodiment, the ratchet arm is radially fixed meaning it is stationary in the radial direction with respect to the disk 6. In one embodiment, the wind vane 16 engages the disk 6 on a landing zone for the read/write head 8.

Figure 4D:
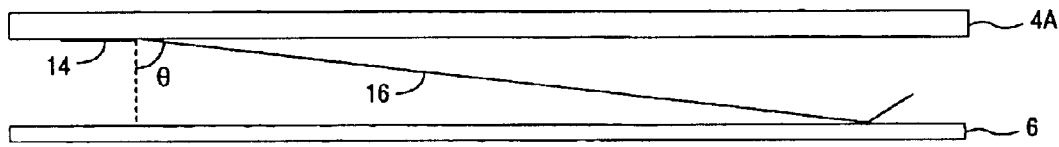
FIG. 4D shows the angle θ of the ratchet arm which together with the friction coefficient determines the frictional force applied by the ratchet arm when the disk is rotating in the forward and reverse directions.

In one embodiment, the angle of the ratchet arm with respect to the disk 6 together with the friction coefficient are selected so that the wind vane 16 "bites" into the surface of the disk 6 to prevent the disk 6 from rotating in the reverse direction. Referring to FIG. 4D, the wind vane 16 will bite into the disk 6 as long as the friction coefficient is greater than the tangent of the angle θ.

In an alternative embodiment, the angle θ and/or the friction coefficient are selected so that the disk 6 is allowed to slip in the reverse direction. In this embodiment, the frictional force (drag) between the wind vane 16 and the surface of the disk 6 when the disk 6 rotates in the forward direction is computed according to:

$$F=(u*P*\sin\theta)/(\sin\theta+u*\cos\theta)$$

The frictional force (drag) between the wind vane 16 and the surface of the disk 6 when the disk 6 rotates in the reverse direction is computed according to:

$$F=(u*P*\sin\theta)/(\sin\theta-u*\cos\theta)$$

In the above equations:
F=Frictional force between the wind vane 16 and the surface of the disk 6.
u=Friction coefficient between the wind vane 16 and the surface of the disk 6.
θ=Angle that ratchet arm makes with the vertical.
P=Preload force or vertical force applied to the wind vane 16.

The above equations show that the frictional force in the reverse direction is greater than the frictional force in the forward direction.

Figure 5A:
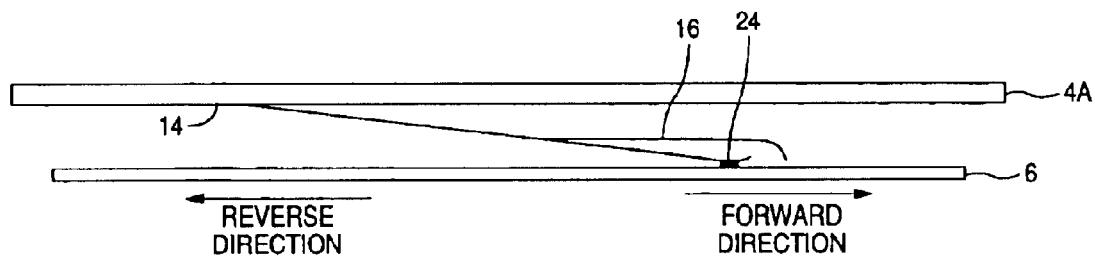
FIG. 5A shows an embodiment of the present invention wherein the ratchet arm biases a stopper toward a top or bottom surface of the disk and a wind vane disengage the ratchet arm.
Figure 5B:
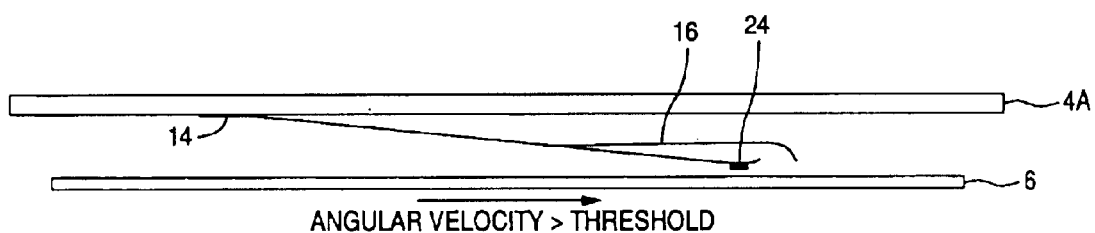
FIG. 5B illustrates how windage generated by the disk rotating pushes on the wind vane to move the stopper in an axial direction away from the top surface of the disk.
Figure 5C:
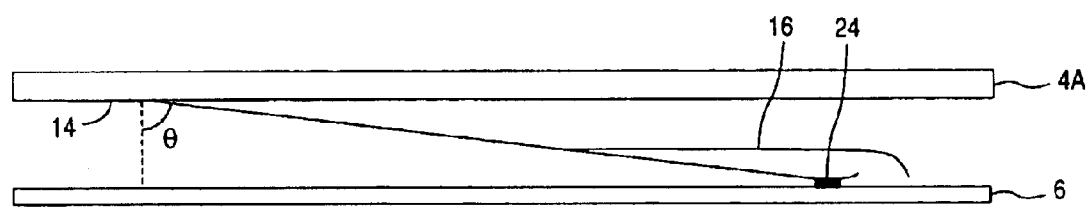
FIG. 5C shows the angle θ of the ratchet arm which together with the friction coefficient determines the frictional force applied by the ratchet arm when the disk is rotating in the forward and reverse directions.

FIG. 5A shows an embodiment of the present invention wherein the ratchet arm biases a stopper 24 toward a top surface of the disk 6 and a wind vane 16 disengages the stopper 24. FIG. 5B illustrates how windage generated by the disk 6 rotating pushes on the wind vane 16 to move the stopper 24 in an axial direction away from the top surface of the disk 6. FIG. 5C shows the angle θ of the ratchet arm which together with the friction coefficient determines the frictional force applied by the ratchet arm when the disk 6 is rotating in the forward and reverse directions.

We claim:

1. A disk drive comprising:
    (a) an enclosure;
    (b) a disk;
    (c) a head actuated radially over the disk;
    (d) a spindle motor for rotating the disk; and
    (e) a ratchet arm for engaging a surface of the disk, the ratchet arm comprising:
        a base end connected to the enclosure of the disk drive; and
        a wind vane extending from the base end adjacent the disk;
        wherein the ratchet arm disengages from the disk due to windage pushing on the wind vane, the windage generated by the disk rotating at an angular velocity greater than a threshold.

2. The disk drive as recited in claim 1, wherein the wind vane extends over a top or bottom surface of the disk.

3. The disk drive as recited in claim 1, wherein the ratchet arm further comprises a stopper for engaging a side surface of the disk when the disk is not rotating and disengages from the side surface of the disk by the wind vane when the disk is rotating at an angular velocity greater than the threshold.

4. The disk drive as recited in claim 3, further comprising a spring for attaching the base end of the ratchet arm to the enclosure of the disk drive, the spring for biasing the stopper toward the side surface of the disk.

5. The disk drive as recited in claim 4, wherein the windage rotates the ratchet arm about a pivot in a first direction, and the spring applies a biasing force to rotate the ratchet arm about the pivot in a second direction opposite the first direction.

6. The disk drive as recited in claim 1, wherein when the ratchet arm engages the disk:

(a) the ratchet arm applies a first frictional force to the disk while the disk is rotating in a first direction; and (b) the ratchet arm applies a second frictional force to the disk while the disk is attempting to rotate in a second direction opposite the first direction, wherein the second frictional force is greater than the first frictional force.

7. The disk drive as recited in claim 1, wherein:

(a) the wind vane biases the ratchet arm toward a top or bottom surface of the disk; and (b) the windage pushes the wind vane in an axial direction to disengage the ratchet arm from the top or bottom surface of the disk when the disk is rotating at an angular velocity greater than the threshold.

8. The disk drive as recited in claim 7, wherein the ratchet arm is radially-fixed.

9. A method of ratcheting rotation of a disk in a disk drive to help prevent the disk from rotating in a predetermined direction during shipping of the disk drive, the method comprising:

(a) biasing a stopper against a surface of the disk when the disk is not rotating;

(b) rotating the disk to generate windage; and (c) harnessing the windage to disengage the stopper from the surface of the disk.

10. The method as recited in claim 9, wherein a wind vane extending over a top or bottom surface of the disk harnesses the windage.

11. The method as recited in claim 10, wherein the stopper engages the surface of the disk when the disk is not rotating and disengages from the surface of the disk by the wind vane when the disk is rotating at an angular velocity greater than a threshold.

12. The method as recited in claim 11, wherein a spring biases the stopper against the surface of the disk.

13. The method as recited in claim 12, wherein the windage rotates the wind vane about a pivot in a first direction, and the spring applies a biasing force to rotate the wind vane about a pivot in a second direction opposite the first direction.

14. The method as recited in claim 11, wherein:

(a) the stopper engages a top or bottom surface of the disk; and (b) the wind vane pushes the stopper in an axial direction away from the top or bottom surface of the disk when the disk is rotating at an angular velocity greater than the threshold.

15. The method as recited in claim 14, wherein the wind vane is radially-fixed.

16. The method as recited in claim 9, wherein:

(a) the stopper applies a first frictional force to the surface of the disk while the disk is rotating in a first direction; and (b) the stopper applies a second frictional force to the surface of the disk while the disk attempts to rotate in a second direction opposite the first direction, wherein the second frictional force is greater than the first frictional force.

* * * * *